United States Patent [19]

Kazlauskas

[11] Patent Number: 4,703,698

[45] Date of Patent: Nov. 3, 1987

[54] TRACK MOUNTED WELDING HEAD BASE HAVING CAM PIVOTED DRIVE ASSEMBLY

[76] Inventor: Gasparas Kazlauskas, 10219 Briarwood Dr., Los Angeles, Calif. 90024

[21] Appl. No.: 796,226

[22] Filed: Nov. 8, 1985

[51] Int. Cl.⁴ .................. B23K 37/02; B61B 13/04
[52] U.S. Cl. ............................. 105/29.1; 173/31; 228/29; 104/119
[58] Field of Search .............. 105/29 R, 29.1; 173/31, 173/32, 37; 228/29; 219/60 A; 104/118-120, 247

[56] References Cited

U.S. PATENT DOCUMENTS

| Re. 28,121 | 12/1969 | Gulley | 173/32 |
|---|---|---|---|
| 3,753,525 | 8/1973 | Homes | 228/29 |
| 3,844,468 | 10/1974 | Nelson et al. | 228/29 X |
| 4,092,928 | 6/1978 | Clavin | 104/247 X |
| 4,132,338 | 1/1979 | Bove et al. | 228/29 X |
| 4,158,315 | 6/1979 | Kensrue et al. | 173/32 X |

*Primary Examiner*—Robert B. Reeves
*Assistant Examiner*—Scott H. Werny
*Attorney, Agent, or Firm*—Jack C. Munro

[57] ABSTRACT

A welding head base to facilitate the mounting of a welding head assembly thereon for the purpose of welding a joint between abutted ends of a pipe. The base is mounted on the edges of a thin, sheet material, continuous band track and is capable of low frictional movement, through a series of wheel assemblies, relative to the track. Each wheel assembly includes a wheel with each wheel including an enlarged flange to facilitate the mounting of the welding head base onto the track. Mounted on the fixed section of the base is a sprocket assembly with a sprocket wheel that is to be rotatably driven by a motor. The sprocket is to engage with a series of gear teeth formed within the track. The sprocket assembly is to be movable from an operating position (in engagement with the track) to a retracted position (spacing the sprocket wheel from the track). Movement of the sprocket assembly is caused through the use of a manually operated cam assembly. With the sprocket assembly in the operating position, the cam assembly is pressed against a spring which in turn exerts a continuous bias tending to maintain the sprocket wheel in continuous contact with the track.

3 Claims, 7 Drawing Figures

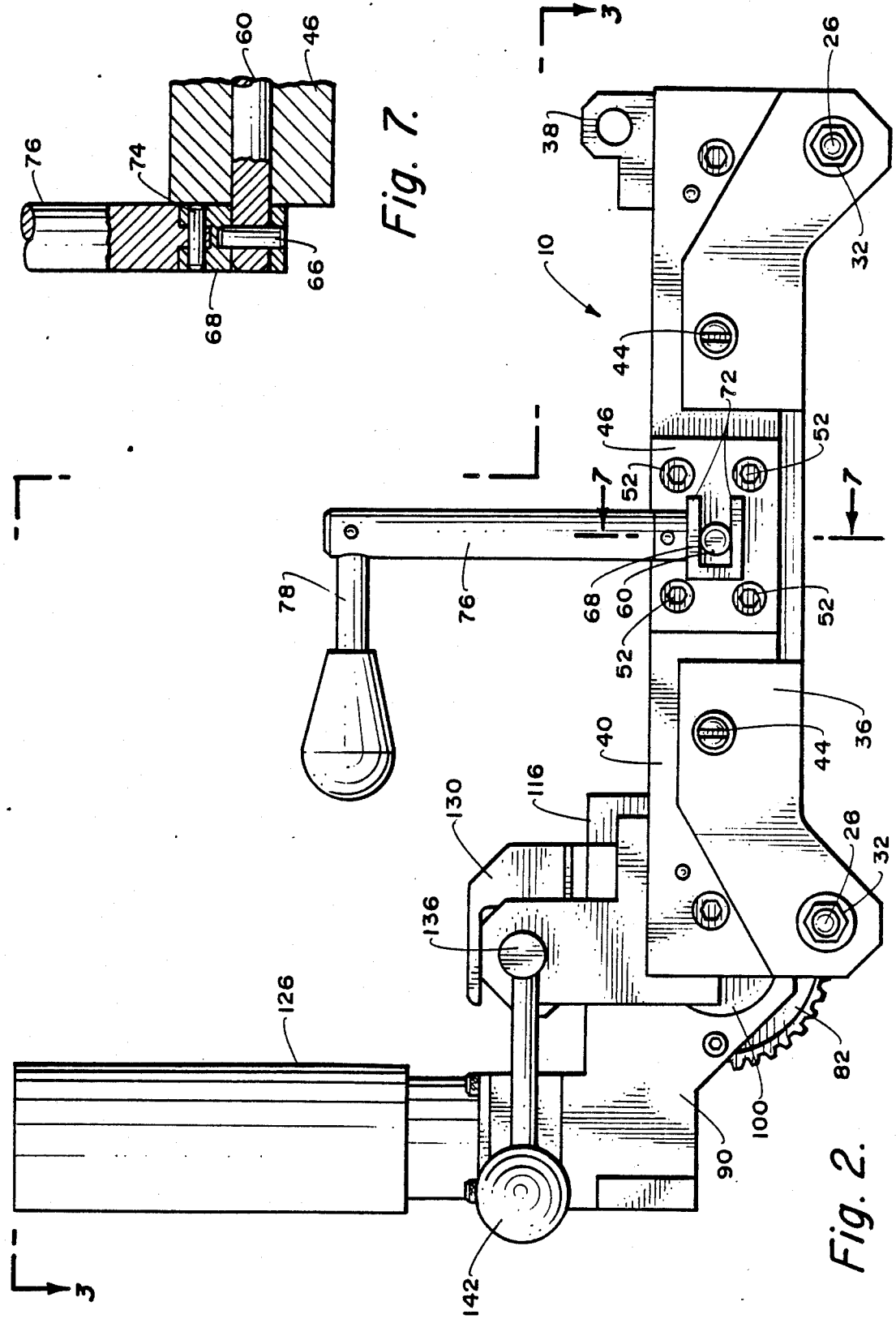

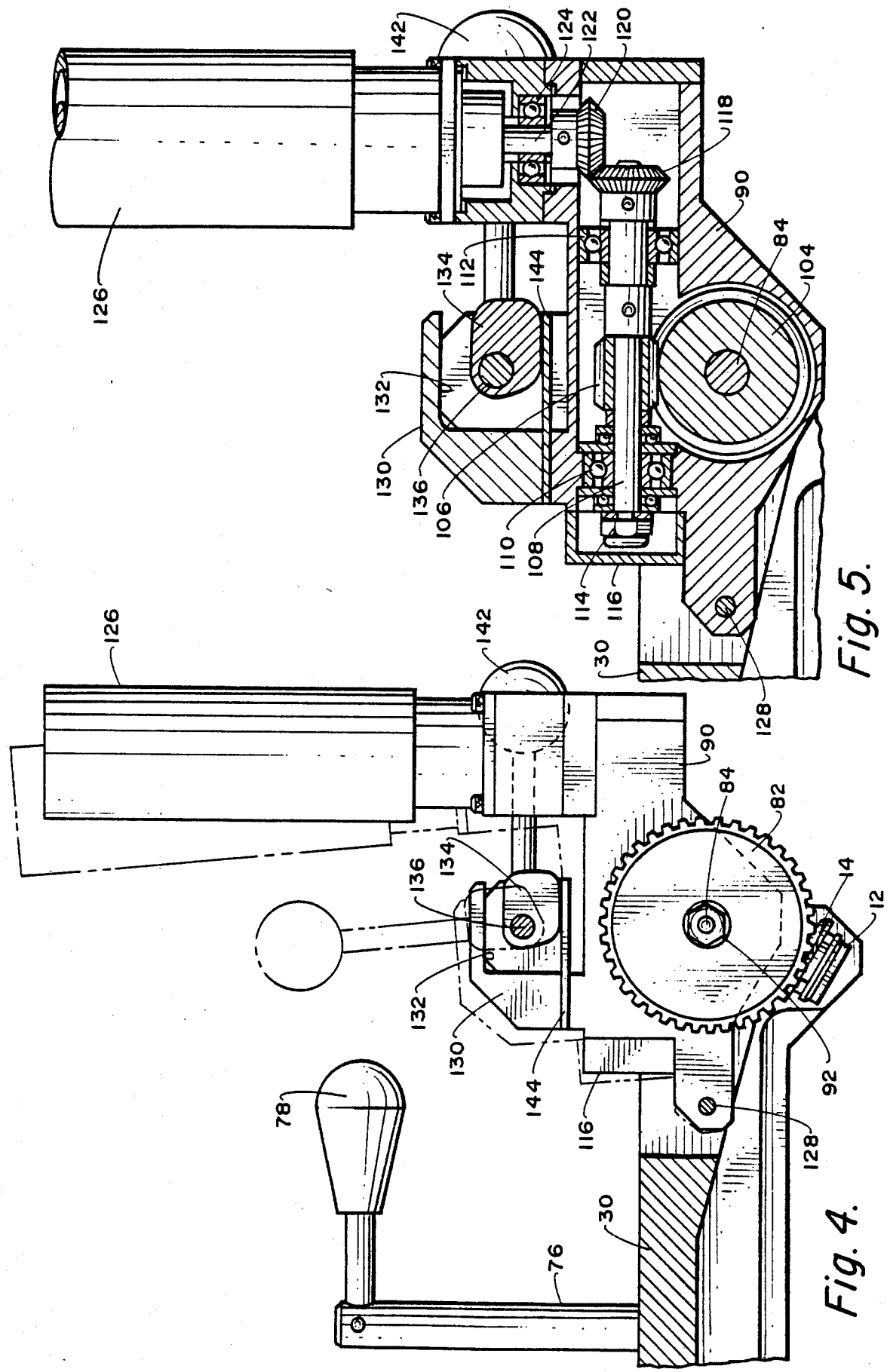

TRACK MOUNTED WELDING HEAD BASE HAVING CAM PIVOTED DRIVE ASSEMBLY

BACKGROUND OF THE INVENTION

The field of this invention relates to the welding of separate metallic cylindrical tubular members. More particularly the subject matter of this invention relates to a track mounted welding head base upon which the welding head is to be mounted during the automatic production of the weld between separate metallic cylindrical tubular members.

The use of automatic welding equipment to weld together two sections of a pipe has long been known. The use of the automatic welding equipment is so as to achieve as close to a perfect weld as possible. The use of the automatic welding equipment is far superior to welding by a human being as it eliminates the possiblity of any human error.

It has been common in the past to mount some form of track assembly on the pipe upon which is mounted the welding head assembly. The welding head assembly is movable around the track to automatically produce a weld which in turn will weld two sections of the pipe together. In order to produce the necessary extremely high quality weld, the equipment designed in the supporting of the welding head onto the pipe must be constructed to be of extremely high quality. Any pause of the welding head assembly, if only for a split second, will be sufficient to affect the quality of the weld. Any flaw of even a fraction of an inch within the entire length of the weld will result in the producing of an unsatisfactory weld. Therefore, it is exceedingly important that the welding head assembly be continuously and positively engaged with the track as long as it is operated to move the welding head assembly about the pipe.

Therefore, there is a need to construct a welding head assembly mounting base to facilitate low frictional movement of the welding head on the track upon which it is mounted and also insure that the movement of the welding head about the pipe is constant and precisely spaced at the same spacing in respect with the pipe as the welding head moves about the pipe.

SUMMARY OF THE INVENTION

The welding head base of the present invention is designed to be mounted onto a thin, sheet material, continuous band track which is fixedly mounted onto a pipe. This welding head base is constructed of two sections, a fixed section and a movable section. Mounted on the fixed section are a pair of wheel assemblies and a similar pair of wheel assemblies are mounted on the movable section. The wheel assemblies on the fixed section are to engage with one edge of the track with the wheel assemblies of the movable section engaging with the opposite edge of the track. The wheel assemblies are to permit low frictional movement of the base upon the track. A spring assembly is mounted between the fixed section and the movable section and exerts a continuous bias tending to locate the sections at the positions where the wheel assemblies engage with the edges of the track. In order to disengage the base from the track, a manually operated cam assembly is utilized which moves the movable section against the bias of the springs to disengage the wheel assemblies from the track. Mounted on the fixed section is also a sprocket assembly which includes a sprocket wheel which is to connect with a gear arrangement formed within the track. The sprocket wheel is tightly held in contact with the gear arrangement by means of a spring bias. A second cam assembly is included within the sprocket assembly and is movable between an operating position and a retracted position. When in the operating position, the cam assembly moves a cam which is pressed against the spring to produce the resilient force holding the sprocket wheel in contact with the gear arrangement. Movement of the cam assembly to the retracted position causes pivoting movement of the sprocket assembly to a position to space the sprocket wheel from the gear arrangement. The wheel assemblies that connect with the edges of the track are constructed to include an enlarged annular upper flange to facilitate the mounting of the welding head base onto the track eliminating precise initial positioning of the base on the track.

BRIEF DESCRIPTION OF THE DRAWINGS

FIG. 2 is a front view of the welding head base of the present invention taken along line 2—2 of FIG. 1;

FIG. 4 is a back view, partly in cross-section, of the welding head base of the present invention taken along line 4—4 of FIG. 3 showing in more detail the drive sprocket assembly included within the structure of the present invention;

FIG. 5 is a cross-sectional view taken along line 5—5 of FIG. 3 showing still in more detail additional aspects of the drive sprocket assembly of this invention;

FIG. 7 is a cross-sectional view through the cam assembly which is to be utilized to move the movable section in respect to the fixed section of the welding head base of the present invention.

DETAILED DESCRIPTION OF THE SHOWN EMBODIMENT

Figure 1:
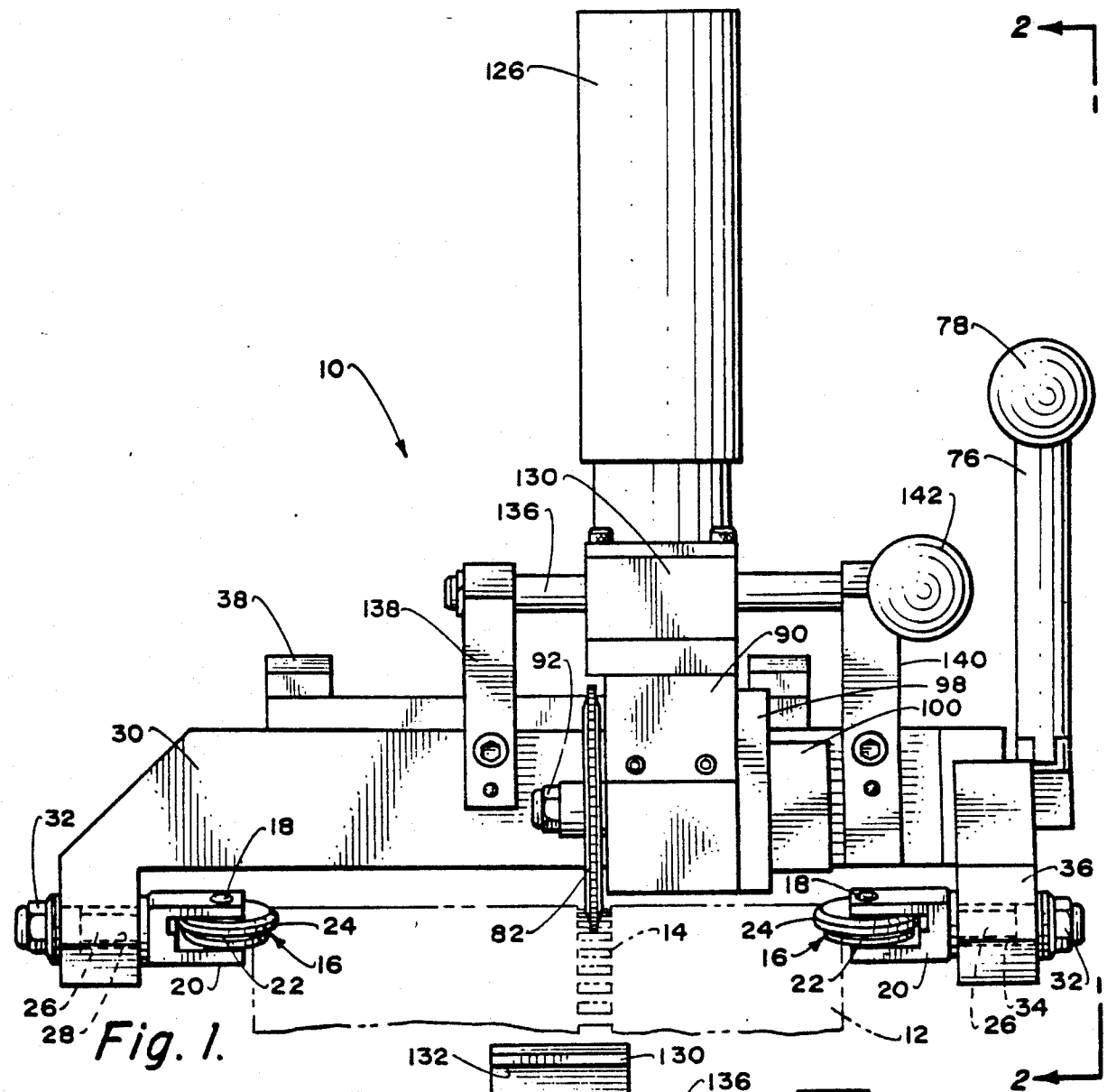
FIG. 1 is a front elevational view of the welding head based of the present invention showing the base mounted on a track, but not showing the welding head assembly itself mounted on the base.
Figure 6:
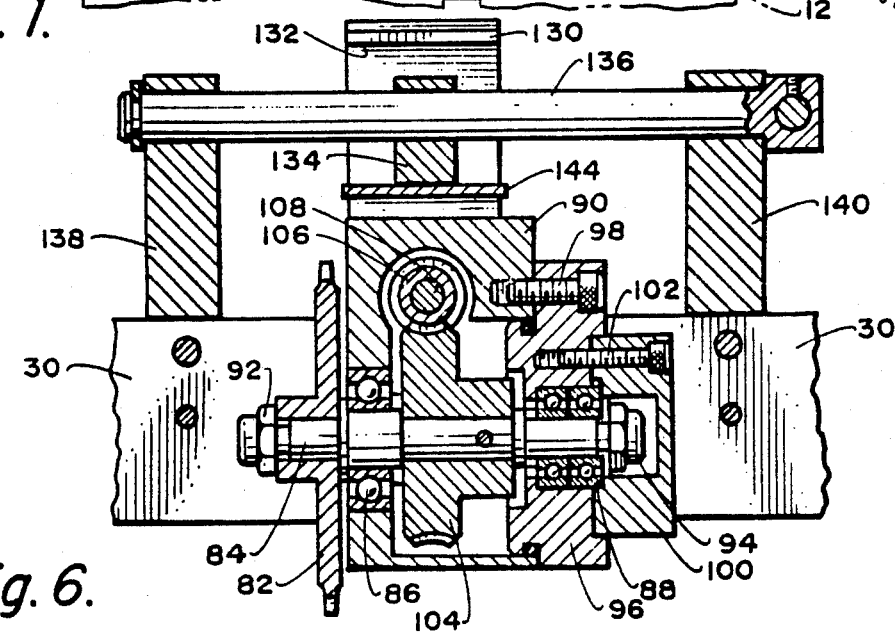
FIG. 6 is a cross-sectional view taken along line of 6—6 of FIG. 3 showing certain aspects of the drive sprocket assembly included within this invention.

Referring particularly to the drawings, there is shown the welding head base 10 of this invention. In FIG. 1 there is depicted a thin, sheet material, continuous band track 12 which has formed therein a series of gear teeth 14. The track 12 is deemed to be conventional and is to be fixedly secured by appropriate securing devices (not shown) onto a section of a pipe. The base 10 of this invention is to be movably mounted on the track 12. This movement is achieved through the use of wheels 16. There are actually four in number of wheels 16 with two of the wheels 16 to engage with one edge of the track 12 and the opposite two wheels 16 engaging with the opposite edge of the track 12. Each wheel 16 is pivotally mounted by a pin 18 within a yoke 20. Each wheel 16 includes an annular recess 22 within which is located the edge of the track 12. Each wheel 16 also includes an enlarged annular flange 24. This flange 24 is to rest against the exterior surface of the track 12 as shown in FIG. 1 of the drawings. The purpose of the flange 24 will be explained further on in this specification.

Each yoke 20 is integrally connected to a threaded rod 26. The threaded rods 26 for the two wheels 16 which are to engage with the left edge (as shown in FIG. 1) of the track 12 are conducted through appropriate openings 28 formed within a fixed section 30 of the base 10. Each of the threaded rods 26 are fixedly secured in position by means of a separate conventional nut 32. The threaded rods 26 of the two wheels 16 that contact the right edge of the track 12 pass through openings 34 formed within a movable section 36. The rods 26 are similarly fixed in place to the movable section 36 by nuts 32. It is to be noted that rods 26 can be pivoted relative to their respective fixed section 30 or movable section 36 to initially adjust the position of each of the wheels 16. Once the desired adjustment has been obtained, the nuts 32 are tightened, thereby fixing the established angular position of each of the wheels 16. It is to be understood that this angular position will vary if the track 12 is mounted upon a smaller diametered pipe (not shown) as compared to a larger diametered pipe.

Mounted on the fixed section 30 is a mounting bracket 38. This mounting bracket 38 is for the purpose of mounting a welding head assembly (not shown) onto the fixed section 30. Fixedly mounted by fasteners (not shown) to one end of the fixed section 30 is an end plate 40. The end plate 40 extends across and covers a specially configured enlarged recess 42. Fixedly mounted and extending outwardly from the end plate 40 are a pair of spaced-apart guide pins 44. Between the guide pins 44, and protruding outwardly from the end plate 40, is a central protrusion 46. Formed within the central protrusion 46 are four in number of holes 48. Within each hole 48 is to be located a coil spring 50. A plug 52 closes the outer end of each of the holes 48 keeping the springs 50 contained within each of the holes 48.

The free outer end of each of the springs 50 rest within a recess 54 (with there being a separate recess 54 for each spring 50) formed within a rear plate 56. A centrally located hole 58 is formed within the rear plate 56 and has mounted therethrough the threaded outer end of the rod 60. This outer end of the rod 60 is fixed in position by a conventional fastening nut 62. This nut 62 is located within the enlarged recess 42 as is the rear plate 56.

The rod 60 also extends through a hole 64 formed through the protrusion 46. The rod 60 is then mounted by a pivot pin 66 through a bifurcated cam member 68. The bifurcated cam member 68 includes an inner cam surface 70 and an outer cam surface 72.

The bifurcated cam member 68 is then fixedly mounted by a pin 74 through member 76. The member 76 is elongated and its outer end is attached to a right angled protruding handle member 78.

The bottom end of the rear plate 56 is mounted on a connecting web 80. The outer edge of the web 80 is fixedly mounted to movable section 36. Movable section 36 has formed therein a pair of spaced-apart openings 81. Only one of the openings 81 is shown within FIG. 3 of the drawings. Located within each opening 81 is a guide rod 44.

Figure 3:
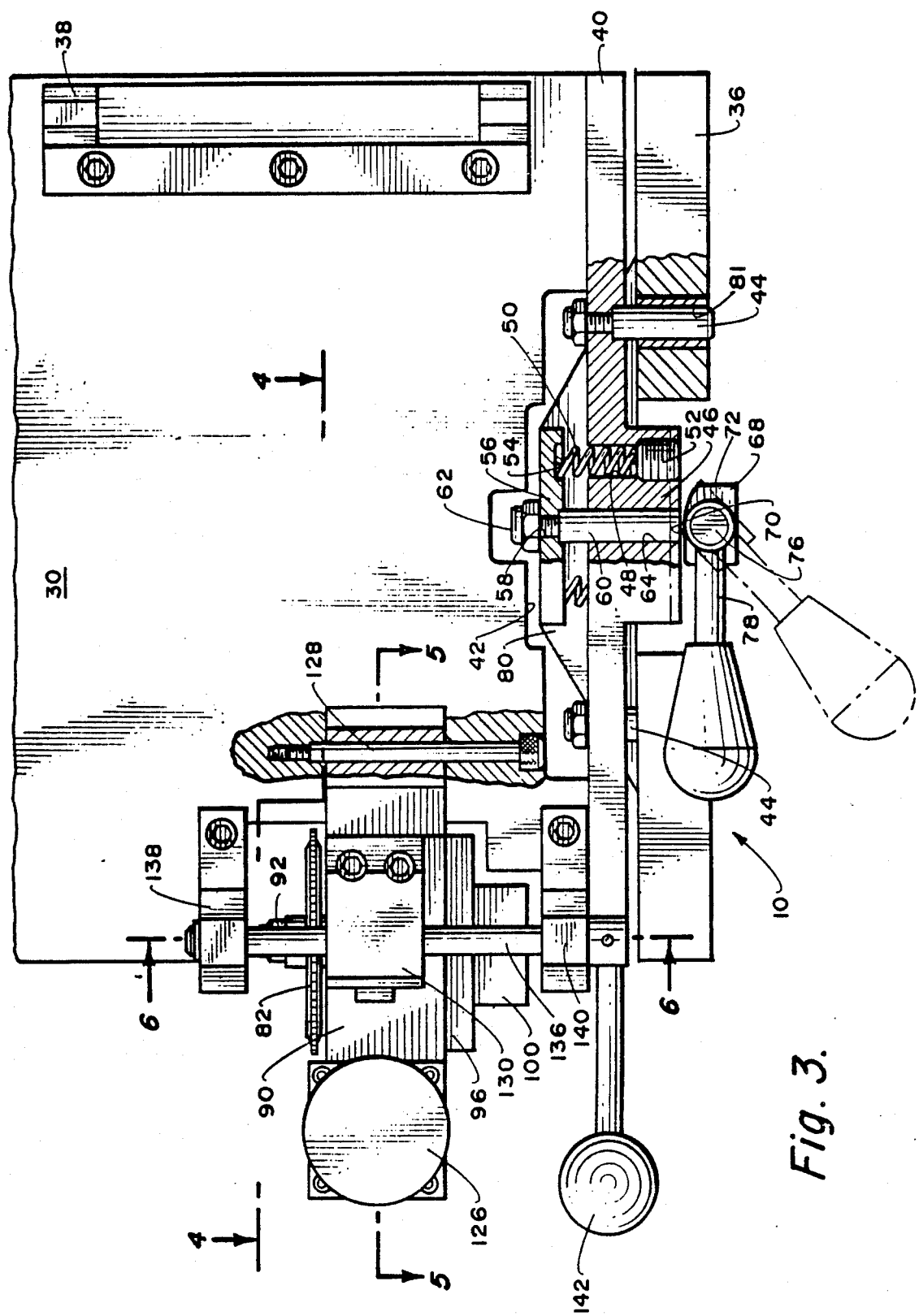
FIG. 3 is a top plan view of the welding head base of the present invention taken along line 3—3 of FIG. 2 showing the welding head base in the position that it would be clamped onto the track.

Manual pivoting of the member 76 by the handle 78 from the solid line position shown in FIG. 3 to the dotted line position causes the inner cam surface 70 to be moved out of engagement with the protrusion 46 and the outer cam surface 72 to be moved into engagement with the protrusion 46. This causes the movable section 36, web 80 and rear plate 56 to be moved relative to the end plate 40. The movable section 36 is moved on the pins 44 a limited amount. The rear plate 56 is moved toward the end plate 40 compressing the springs 50. This causes the wheels 16 to disengage from the right edge of the track 12 a sufficient amount so as to permit the entire welding head base to be separated from the track 12.

When it is desired to relocate the welding head base 10 on the track 12, with the handle 78 in the dotted line position of FIG. 3, the operator places the wheels 16 at their approximate location so that the annular enlarged flange 24 of each wheel 16 comes into contact with the exterior surface of the track 12. With the enlarged annular flange 24 so located, the operator knows that the base 10 is in its proper location and merely by moving the handle 78 from the dotted line position shown in FIG. 3 to the solid line position shown in FIG. 3, the edges of the track 12 will be correctly located within the recesses 22 of the wheels 16. At this time, base 10 can be freely moved in a low frictional movement manner in respect to the track 12.

In order to move the welding head base 10 about the track 12 there is mounted on the base 10 a drive sprocket assembly. The drive sprocket assembly includes a sprocket wheel 82 which has a series of teeth on its periphery which engage with gear teeth 14 of the track 12. the sprocket wheel 82 is mounted on a shaft 84. The shaft 84 is mounted by spaced-apart bearing assemblies 86 and 88 within a gear housing 90. The sprocket wheel 82 is mounted on the shaft 84 by means of a conventional nut 92. The opposite end of the shaft 84 is lineally fixed in position by means of a nut 94. The bearings 88 are mounted within a bearing housing 96 which is fixed to the gear housing 90 by means of conventional bolt fasteners 98. Also, a protective cover 100 encases the nut 94 and is in turn bolted by bolt fasteners 102 to the bearing housing 96.

Mounted on the shaft 84 and located between the bearings 86 and 88 is a gear 104. The gear 104 is in continuous engagement with a worm gear 106. The worm gear 106 is mounted on a shaft 108. The shaft 108 is supported by bearings 110 and 112 within the gear housing 90. The outer end of the shaft 108 is fixed in position by a nut 114 which is enclosed by a cover 116 which is fixedly mounted onto the gear housing 90. The inner end of the shaft 108 connects to a driven bevel gear 118 which in turn is in continuous engagement with a driving bevel gear 120. The driving bevel gear 120 is mounted on a shaft 122 which is rotatably supported by bearing assembly 124 within a portion of the gear housing 90. The shaft 122 is to be rotatably driven by a motor 126 which is electrically driven from a source (not shown). The motor 126 by its housing is fixedly mounted onto the gear housing 90.

The gear housing 90 is pivotally mounted by means of a pivot pin 128 to the fixed section 30. Referring particularly to FIG. 3 of the drawings, it is shown that the pivot pin 128 constitutes a bolt which is threadably secured in position within the fixed section 30.

Fixedly mounted onto the gear housing 90 is a cam housing 130. The cam housing 130 includes an interior chamber 132. Within the interior chamber 132 is located a cam 134. Cam 134 is fixedly mounted onto a cam shaft 136. The outer end of the cam shaft 136 is rotatably mounted within a support bracket 138 which in turn is fixedly mounted onto the fixed section 30. In a similar manner the inner end of the cam shaft 136 is rotatably mounted within a bracket 140 which is also fixedly mounted on the fixed section 30. The end of the cam shaft 136, that is located directly adjacent the bracket 140, is fixedly mounted onto a handle member 142. Handle member 142 is to be used to manually pivot the cam shaft 136 from the solid line position shown in FIG. 4 to the dotted line position. With the cam 134 in the solid line position, the cam is in continuous contact with a spring plate 144. This spring plate 144 functions as a leaf spring exerting a continuous spring bias through the gear housing 90 and the wheel 82 tending to keep the wheel 82 into firm connection with the gear teeth 14.

With the cam shaft 136 pivoted so that the cam 134 is in the dotted line position of FIG. 4, the cam 134 pushes against the uppermost surface of the interior chamber 132 resulting in pivoting of the entire housing 90 about the pivot pin 128 to assume the dotted line position shown in FIG. 4. This causes the sprocket wheel 82 to be slightly spaced from the teeth 14 of the track 12. In this particular position the base 10 can be freely moved to any desired position on the track 12. When it is desired to eliminate this freedom of movement and precisely drive the base 10 at a steady rate on the track 12, the operator only need to manually move the handle 142 to the solid line position in FIG. 4 which in turn will result in the sprocket wheel 82 to again re-engage with the gear teeth 14. Operation of motor 126 will then cause the wheel 82 to be rotatably driven which will result in the entire base 10 being moved at a steady rate along the track 12.

What is claimed is:

1. A track mounted welding head base comprising:
   a housing adapted to be mounted onto a track which is fixed onto the structure to be welded;
   a drive sprocket assembly mounted on said housing, said drive sprocket assembly adapted for connection with the track for moving of the welding head base along the track, said drive sprocket assembly being movable between an operating position adapted to engage with the track and a retracted position to be spaced from the track; and
   cam means mounted on said housing, said drive sprocket assembly connecting with said cam means, said cam means being movable to cause movement of said drive sprocket assembly between said operating position and said retracted postiion, said drive sprocket assembly including a leaf spring, with said cam means in said operating position said cam means pressing directly against said leaf spring which applies a continuous resilient force tending to maintain firm engagement of said sprocket assembly with the track, a cam housing atached to and part of said drive sprocket assembly, said cam means physically contacting only said cam housing when in its said retracted position resulting in causing physical movement of said drive sprocket assembly to said retracted position.

2. A track mounted welding head base comprising:
   a housing composed of a fixed section and a movable section, said movable section being mounted on said fixed section, said movable section being lineally movable relative to said fixed section between an engaged position and a disengaged position, a plurality of wheel assemblies mounted on both said fixed section and said movable section, with said movable section in said engaged position said wheel assemblies are adapted for connection with the edge of a thin sheet material continuous band track, with said movable section in said disengaged position said wheel assemblies are adapted for disconnection from the track;
   spring means located between said movable section and said fixed section, said spring means exerting a continuous force against said movable section tending to locate such in said engaged position;
   a first cam means mounted on said movable section, said first cam means connecting with said fixed section, said first cam means movable from a camming position to a released position, with said first cam means in said camming position said movable section being in said disengaged position, with said first cam means in said released position said movable section being in said engaged position;
   second cam means mounted on said fixed section, a drive sprocket assembly connecting with said second cam means, said drive sprocket assembly adapted for connection with the track for moving of said welding head base along the track, said drive sprocket assembly being movable between an operating position adapted to engage with the track and a retracted position being spaced from the track, a leaf spring fixedly secured to said movable section, with said second cam means in said operating position said second cam means pressing directly against said leaf spring which applies a continuous resilient force through said sprocket assembly to the track; and
   a cam housing attached to and part of said drive sprocket assembly, said second cam means physically contacting only said cam housing when in its said retracted position resulting in causing physical movement of said drive sprocket assembly to said retracted position.

3. The track mounted welding head base as defined in claim 1 wherein:
   said sprocket assembly being pivotally mounted on said fixed section.

* * * * *